United States Patent
Lee

(10) Patent No.: US 12,271,984 B2
(45) Date of Patent: Apr. 8, 2025

(54) METHOD, DEVICE, AND NON-TRANSITORY COMPUTER-READABLE RECORDING MEDIUM FOR DISPLAYING GRAPHIC OBJECT ON IMAGE

(71) Applicant: MOAIS, INC., Seoul (KR)

(72) Inventor: Yong Geun Lee, Seoul (KR)

(73) Assignee: MOAIS. INC., Seoul (KR)

( * ) Notice: Subject to any disclaimer, the term of this patent is extended or adjusted under 35 U.S.C. 154(b) by 147 days.

(21) Appl. No.: 18/031,189

(22) PCT Filed: Sep. 29, 2021

(86) PCT No.: PCT/KR2021/013321
§ 371 (c)(1),
(2) Date: Jun. 12, 2023

(87) PCT Pub. No.: WO2022/085978
PCT Pub. Date: Apr. 28, 2022

(65) Prior Publication Data
US 2023/0377224 A1    Nov. 23, 2023

(30) Foreign Application Priority Data
Oct. 23, 2020    (KR) .......................... 10-2020-0138416

(51) Int. Cl.
*G06T 11/60*    (2006.01)
*G06T 7/73*    (2017.01)

(52) U.S. Cl.
CPC ................ *G06T 11/60* (2013.01); *G06T 7/73* (2017.01); *G06T 2207/20084* (2013.01);
(Continued)

(58) Field of Classification Search
None
See application file for complete search history.

(56) References Cited

U.S. PATENT DOCUMENTS

| | | | |
|---|---|---|---|
| 12,067,660 B2 * | 8/2024 | Andrew | G06T 17/20 |
| 2019/0347826 A1 * | 11/2019 | Zhang | G06N 3/08 |

(Continued)

FOREIGN PATENT DOCUMENTS

| | | |
|---|---|---|
| KR | 1020160109570 A | 9/2016 |
| KR | 1020190019824 A | 2/2019 |
| WO | 2017187641 A1 | 11/2017 |

*Primary Examiner* — Yanna Wu
(74) *Attorney, Agent, or Firm* — Dinsmore & Shohl LLP; Yongsok Choi, Esq.

(57) ABSTRACT

A method for displaying a graphic object on an image is provided. The method includes the steps of: acquiring, with respect to a first graphic object inputted by a user onto a first image of a person's posture, attribute information of the first graphic object that defines the first graphic object; deriving, on the basis of a feature point detected from each of the first image and a second image of a person's posture, a transformation model that defines a transformation relationship between the attribute information of the first graphic object and attribute information of a second graphic object to be displayed on the second image in correspondence to the first graphic object; and displaying, on the basis of the transformation model, the second graphic object at a position on the second image corresponding to a position of the first graphic object on the first image.

7 Claims, 3 Drawing Sheets

(52) U.S. Cl.
CPC ............... *G06T 2207/20092* (2013.01); *G06T 2207/30196* (2013.01); *G06T 2207/30221* (2013.01)

(56) References Cited

U.S. PATENT DOCUMENTS

2020/0222757 A1   7/2020   Yang
2023/0162332 A1*  5/2023   Yang ....................... G06T 19/20
                                                    348/241

* cited by examiner

METHOD, DEVICE, AND NON-TRANSITORY COMPUTER-READABLE RECORDING MEDIUM FOR DISPLAYING GRAPHIC OBJECT ON IMAGE

CROSS-REFERENCE TO RELATED APPLICATION(S)

This application is a national phase of Patent Cooperation Treaty (PCT) International Application No. PCT/KR2021/013321 filed on Sep. 29, 2021, which claims priority to Korean Patent Application No. 10-2020-0138416 filed on Oct. 23, 2020. The entire contents of PCT International Application No. PCT/KR2021/013321 and Korean Patent Application No. 10-2020-0138416 are hereby incorporated by reference.

FIELD OF THE INVENTION

The present invention relates to a method, system, and non-transitory computer-readable recording medium for displaying a graphic object on an image.

BACKGROUND

Because learning and practicing proper postures is so important in learning any sport, people spend a lot of time and money working with coaches to correct their postures. In order to provide more effective education in this correction process, a coach often shows a learner an image of the learner's posture and another image of a person's posture that may be compared to the image (e.g., an image of a professional athlete taking a posture corresponding to the learner's posture) to compare and illustrate the two postures.

As an example of related conventional techniques, a technique has been introduced which assists a coach to draw a graphic object such as a line or figure at a specific position on an image of a person's posture to facilitate comparing and illustrating two postures as described above. However, according to the techniques introduced so far as well as the aforementioned conventional technique, there is a problem that it causes inconvenience to draw a graphic object such as a line or figure at a specific position on an image of a learner's posture, and then redraw a graphic object corresponding to the above graphic object at a position on another image of a person's posture corresponding to the specific position.

SUMMARY OF THE INVENTION

One object of the present invention is to solve all the above-described problems in prior art.

Another object of the invention is to acquire, with respect to a first graphic object inputted by a user onto a first image of a person's posture, attribute information of the first graphic object that defines the first graphic object; derive, on the basis of a feature point detected from each of the first image and a second image of a person's posture, a transformation model that defines a transformation relationship between the attribute information of the first graphic object and attribute information of a second graphic object to be displayed on the second image in correspondence to the first graphic object; and display, on the basis of the transformation model, the second graphic object at a position on the second image corresponding to a position of the first graphic object on the first image.

Yet another object of the invention is to assist a user to more conveniently compare and illustrate two postures by, when the user inputs a first graphic object onto a first image of a person's posture, automatically displaying a second graphic object at a position on a second image corresponding to a position of the first graphic object on the first image.

The representative configurations of the invention to achieve the above objects are described below.

According to one aspect of the invention, there is provided a method comprising the steps of: acquiring, with respect to a first graphic object inputted by a user onto a first image of a person's posture, attribute information of the first graphic object that defines the first graphic object; deriving, on the basis of a feature point detected from each of the first image and a second image of a person's posture, a transformation model that defines a transformation relationship between the attribute information of the first graphic object and attribute information of a second graphic object to be displayed on the second image in correspondence to the first graphic object; and displaying, on the basis of the transformation model, the second graphic object at a position on the second image corresponding to a position of the first graphic object on the first image.

According to another aspect of the invention, there is provided a system comprising: an image management unit configured to acquire, with respect to a first graphic object inputted by a user onto a first image of a person's posture, attribute information of the first graphic object that defines the first graphic object; a transformation model derivation unit configured to derive, on the basis of a feature point detected from each of the first image and a second image of a person's posture, a transformation model that defines a transformation relationship between the attribute information of the first graphic object and attribute information of a second graphic object to be displayed on the second image in correspondence to the first graphic object; and a graphic object management unit configured to display, on the basis of the transformation model, the second graphic object at a position on the second image corresponding to a position of the first graphic object on the first image.

In addition, there are further provided other methods and systems to implement the invention, as well as non-transitory computer-readable recording media having stored thereon computer programs for executing the methods.

According to the invention, it is possible to acquire, with respect to a first graphic object inputted by a user onto a first image of a person's posture, attribute information of the first graphic object that defines the first graphic object; derive, on the basis of a feature point detected from each of the first image and a second image of a person's posture, a transformation model that defines a transformation relationship between the attribute information of the first graphic object and attribute information of a second graphic object to be displayed on the second image in correspondence to the first graphic object; and display, on the basis of the transformation model, the second graphic object at a position on the second image corresponding to a position of the first graphic object on the first image.

According to the invention, it is possible to assist a user to more conveniently compare and illustrate two postures by, when the user inputs a first graphic object onto a first image of a person's posture, automatically displaying a second graphic object at a position on a second image corresponding to a position of the first graphic object on the first image.

DETAILED DESCRIPTION

Figure 1:
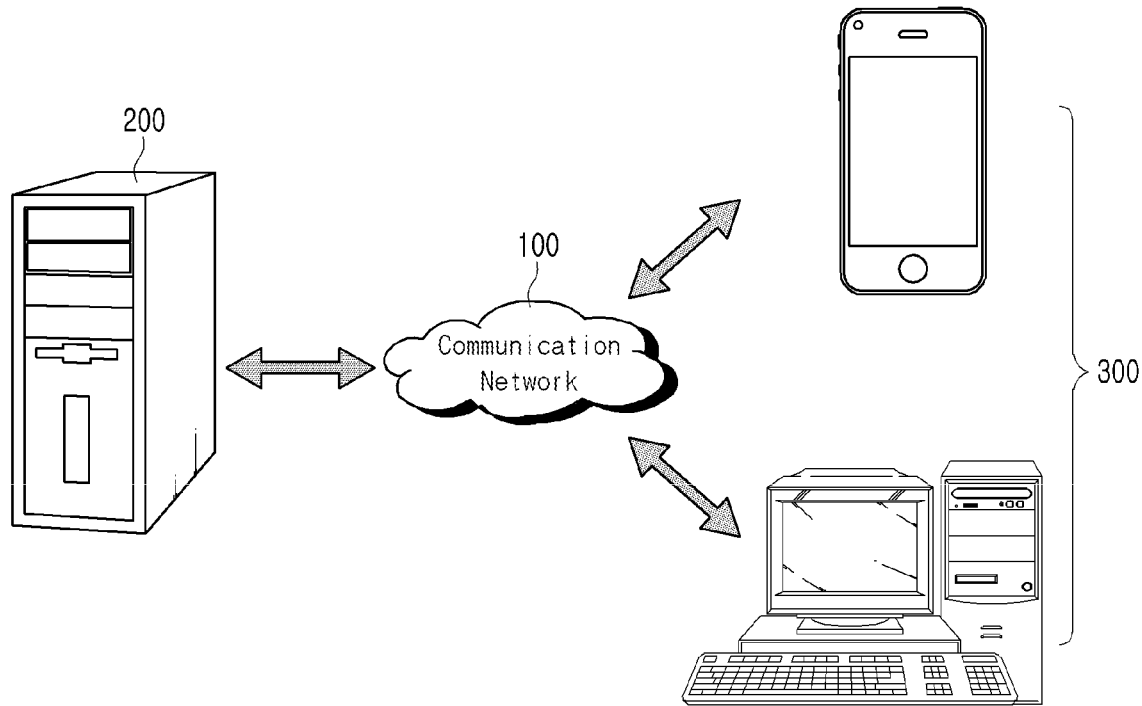
FIG. 1 schematically shows the configuration of an entire system for displaying a graphic object on an image according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Although the descriptions herein are focused on golf, it will be apparent to those skilled in the art that the present invention may be utilized even for displaying a graphic object on an image of a posture taken in sports other than golf. For example, the present invention may be utilized for displaying a graphic object on an image of a baseball swing or a workout or yoga posture.

Although the descriptions herein are focused on detecting joints from an image of a person's posture in order to facilitate understanding, it should be understood that the present invention is not limited to detecting the joints and may also be utilized for detecting body parts other than the joints.

Configuration of the Entire System

FIG. 1 schematically shows the configuration of the entire system for displaying a graphic object on an image according to one embodiment of the invention.

As shown in FIG. 1, the entire system according to one embodiment of the invention may comprise a communication network 100, a graphic object display system 200, and a device 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as WiFi communication, WiFi-Direct communication, Long Term Evolution (LTE) communication, 5G communication, Bluetooth communication (including Bluetooth Low Energy (BLE) communication), infrared communication, and ultrasonic communication. As another example, the communication network 100 may be an optical communication network, at least a part of which may be implemented with a conventional communication scheme such as LiFi (Light Fidelity).

Next, the graphic object display system 200 according to one embodiment of the invention may function to: acquire, with respect to a first graphic object inputted by a user onto a first image of a person's posture, attribute information of the first graphic object that defines the first graphic object; derive, on the basis of a feature point detected from each of the first image and a second image of a person's posture, a transformation model that defines a transformation relationship between the attribute information of the first graphic object and attribute information of a second graphic object to be displayed on the second image in correspondence to the first graphic object; and display, on the basis of the transformation model, the second graphic object at a position on the second image corresponding to a position of the first graphic object on the first image.

The configuration and functions of the graphic object display system 200 according to the invention will be discussed in more detail below.

Next, the device 300 according to one embodiment of the invention is digital equipment capable of connecting to and then communicating with the graphic object display system 200, and any type of digital equipment having a memory means and a microprocessor for computing capabilities, such as a smart phone, a tablet, a smart watch, a smart band, smart glasses, a desktop computer, a notebook computer, a workstation, a personal digital assistant (PDAs), a web pad, and a mobile phone, may be adopted as the device 300 according to the invention.

In particular, the device 300 may include an application (not shown) for assisting a user to receive services according to the invention from the graphic object display system 200. The application may be downloaded from the graphic object display system 200 or an external application distribution server (not shown). Meanwhile, the characteristics of the application may be generally similar to those of an image management unit 210, a transformation model derivation unit 220, a graphic object management unit 230, a communication unit 240, and a control unit 250 of the graphic object display system 200 to be described below. Here, at least a part of the application may be replaced with a hardware device or a firmware device that may perform a substantially equal or equivalent function, as necessary.

Configuration of the Graphic Object Display System

Hereinafter, the internal configuration of the graphic object display system 200 crucial for implementing the invention and the functions of the respective components thereof will be discussed.

Figure 2:
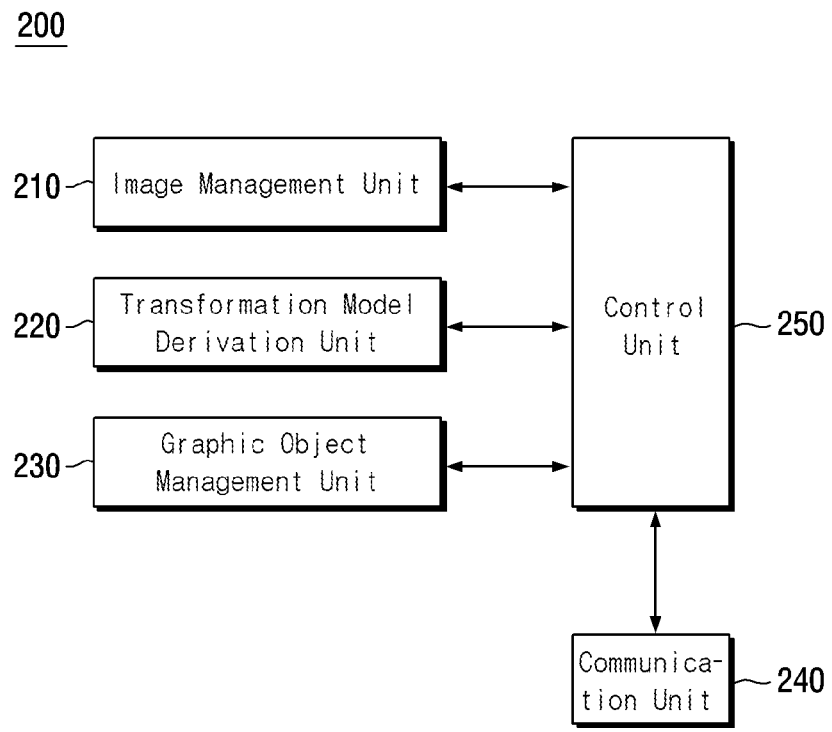
FIG. 2 specifically shows the internal configuration of a graphic object display system according to one embodiment of the invention.

FIG. 2 specifically shows the internal configuration of the graphic object display system 200 according to one embodiment of the invention.

As shown in FIG. 2, the graphic object display system 200 according to one embodiment of the invention may comprise an image management unit 210, a transformation model derivation unit 220, a graphic object management unit 230, a communication unit 240, and a control unit 250. According to one embodiment of the invention, at least some of the image management unit 210, the transformation model derivation unit 220, the graphic object management unit 230, the communication unit 240, and the control unit 250 may be program modules to communicate with an external system (not shown). The program modules may be included in the graphic object display system 200 in the form of operating systems, application program modules, or other program modules, while they may be physically stored in a variety of commonly known storage devices. Further, the program modules may also be stored in a remote storage device that may communicate with the graphic object display system 200. Meanwhile, such program modules may include, but are not limited to, routines, subroutines, programs, objects, components, data structures, and the like for performing specific tasks or executing specific abstract data types as will be described below in accordance with the invention.

Meanwhile, the above description is illustrative although the graphic object display system 200 has been described as above, and it will be apparent to those skilled in the art that at least a part of the components or functions of the graphic object display system 200 may be implemented in the device 300 or a server (not shown) or included in an external system (not shown), as necessary.

First, the image management unit 210 according to one embodiment of the invention may function to acquire, with respect to a first graphic object inputted by a user onto a first image of a person's posture, attribute information of the first graphic object that defines the first graphic object.

Specifically, according to one embodiment of the invention, attribute information of a graphic object refers to information that may define the graphic object, and may include position information and shape information of the graphic object.

More specifically, according to one embodiment of the invention, the position information of the graphic object may include information on coordinates at which the graphic object is positioned on an image of a person's posture. According to one embodiment of the invention, the information on the coordinates of the graphic object may refer to absolute coordinates on the image (e.g., values of an x-coordinate and a y-coordinate in a two-dimensional image), or refer to relative coordinates from a specific position on the image (e.g., a position of a right shoulder joint of the person detected on the image).

Further, according to one embodiment of the invention, the shape information of the graphic object may include information on a form, size, length, color, and the like of the graphic object. According to one embodiment of the invention, the form of the graphic object may include a point, a line, an angle represented by two lines, a tetragon, a circle, and the like.

For example, according to one embodiment of the invention, when the graphic object is rectangular, the attribute information of the graphic object may include absolute coordinates of a point in the upper left corner of the graphic object and absolute coordinates of a point in the lower right corner of the graphic object as the position information of the graphic object, and may include the rectangle as the shape information of the graphic object.

As another example, according to one embodiment of the invention, when the graphic object is circular, the attribute information of the graphic object may include absolute coordinates of a center point of the graphic object and absolute coordinates of one point on the circle as the position information of the graphic object, and may include the circle and a length of the radius as the shape information of the graphic object. In this case, when the length of the radius is included in the shape information of the graphic object, the absolute coordinates of the one point on the circle may not be included in the position information of the graphic object.

Meanwhile, the attribute information of the graphic object according to one embodiment of the invention is not limited to the foregoing, and may be diversely changed as long as the objects of the invention may be achieved.

Next, the transformation model derivation unit 220 according to one embodiment of the invention may function to detect a feature point from each of the first image of the person's posture and a second image of a person's posture.

Specifically, the transformation model derivation unit 220 according to one embodiment of the invention may detect a feature point from each of the first image and the second image using an artificial neural network model, and the feature point may include at least one of at least one joint of the person and a golf club. Meanwhile, according to one embodiment of the invention, the feature point detected from the second image may be detected in advance before a feature point is detected from the first image, and stored in a server (not shown) or a separate database (not shown).

More specifically, the transformation model derivation unit 220 according to one embodiment of the invention may function to derive probability information on at least one of a position of at least one joint of a person and a position of a golf club from an image of the person's posture using an artificial neural network model, and detect a feature point from the image with reference to the probability information.

Further, the transformation model derivation unit 220 according to one embodiment of the invention may generate a probability map (i.e., output data of the artificial neural network model) by using the image of the person's posture as input data of the artificial neural network model.

For example, according to one embodiment of the invention, the probability map may be a two-dimensional heat map. Further, the transformation model derivation unit 220 according to one embodiment of the invention may generate at least one two-dimensional heat map image for each of the at least one joint of the person using the artificial neural network model, and may derive the probability information on the two-dimensional position of the at least one joint of the person on the basis of properties such as the two-dimensional position of the at least one joint being more likely to correspond to pixels with larger values, among pixels constituting the generated at least one heat map image, or the position of the at least one joint being less likely to be accurately specified as pixels with small values are widely distributed in the heat map, and being more likely to be accurately specified as pixels with large values are narrowly distributed in the heat map.

Meanwhile, the above description of deriving the probability information on the position of the at least one joint of the person may be similarly applied to the case where the feature point detected by the transformation model derivation unit 220 according to one embodiment of the invention is a golf club, and thus a detailed description thereof will be omitted.

Meanwhile, the artificial neural network model according to one embodiment of the invention may include, for example, a convolutional neural network (CNN) model, a recurrent neural network (RNN) model, a deep belief network (DBN) model, or an artificial neural network model in which the foregoing models are combined. However, the artificial neural network model according to one embodiment of the invention is not limited to those mentioned above, and may be diversely changed as long as the objects of the invention may be achieved.

Further, the artificial neural network model according to one embodiment of the invention may be a model that is light-weighted using depthwise convolution and pointwise convolution.

In addition, the artificial neural network model according to one embodiment of the invention may be a model that is light-weighted using a light-weighting algorithm such as pruning, weight quantization, and residual learning.

Specifically, since artificial neural network models commonly used in object recognition technology require a high level of computing resources to be consumed for a high level of recognition performance, it is often difficult to use such models in environments where only limited computing resources are provided (e.g., mobile devices). Therefore, according to one embodiment of the invention, an artificial neural network model may be light-weighted using depthwise convolution and pointwise convolution, and the light-weighted artificial neural network model may be used in a mobile device so that at least one joint of a person may be detected from an image of the person's posture.

Here, the depthwise convolution according to one embodiment of the invention may refer to a convolution process in which a kernel is applied for each depth (i.e., each channel) of an input layer, in performing convolution in the artificial neural network model according to one embodiment of the invention. Meanwhile, since the method of operation using the applied kernel is the same as that of general convolution, a detailed description thereof will be omitted.

Further, the pointwise convolution according to one embodiment of the invention may refer to a convolution process in which a kernel of size 1×1×M (i.e., a kernel of width 1, height 1, and depth M) is applied for each point of an input layer, in performing convolution in the artificial neural network model according to one embodiment of the invention.

Figure 5A:
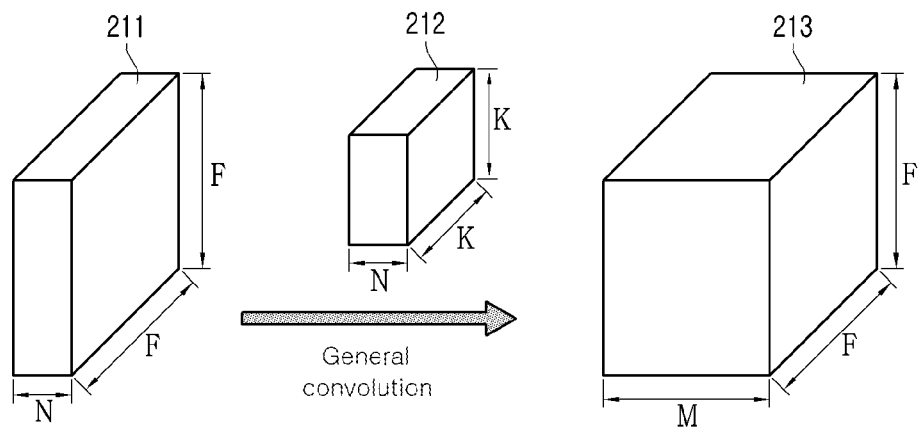
FIG. 5A illustratively shows how general convolution is performed according to one embodiment of the invention.

FIG. 5A illustratively shows how general convolution is performed according to one embodiment of the invention.

Figure 5B:
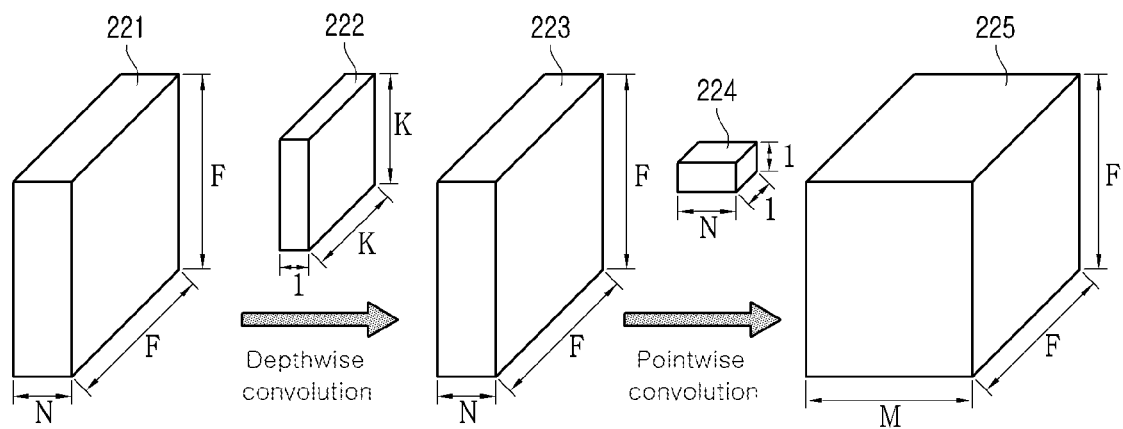
FIG. 5B illustratively shows how depthwise convolution and pointwise convolution are performed according to one embodiment of the invention.

FIG. 5B illustratively shows how depthwise convolution and pointwise convolution are performed according to one embodiment of the invention.

Referring to FIG. 5A, according to one embodiment of the invention, it may be assumed that the width, height, and depth of an input layer 211 are F, F, and N, respectively; the width, height, and depth of each kernel 212 are K, K, and N, respectively; and the width, height, and depth of an output layer 213 are F, F, and M, respectively. Here, it is assumed that padding and stride are appropriately sized such that there is no change in the width and height of the input layer 211 and the output layer 213. In this case, in the general convolution, the kernel 212 is applied to the input layer 211 to constitute one depth of the output layer 213 (through F×F×K×K×N operations), and these operations are performed for M kernels 212 so that a total of F×F×K×K×N×M operations are performed.

Referring to FIG. 5B, according to one embodiment of the invention, it may be assumed that the width, height, and depth of an input layer 221 are F, F, and N, respectively; the width, height, and depth of each kernel 222 in the depthwise convolution are K, K, and 1, respectively; the width, height, and depth of each kernel 224 in the pointwise convolution are 1, 1, and N, respectively; and the width, height and depth of an output layer 225 are F, F, and M, respectively. In this case, the kernel 222 is applied for each depth of the input layer 221 to constitute each depth of an intermediate layer 223 (through F×F×K×K×1×N operations). Then, the kernel 224 is applied for each point of the intermediate layer 223 to constitute one depth of the output layer 225 (through F×F×1×1×N operations), and these operations are performed for M kernels 224 so that a total of F×F×1×1×N×M operations are performed in the pointwise convolution. Therefore, according to one embodiment of the invention, a total of (F×F×K×K×1×N)+(F×F×1×1×N×M) operations are performed in the depthwise convolution and the pointwise convolution, so that the amount of operations is reduced compared to the general convolution.

Meanwhile, the light-weighting algorithms according to one embodiment of the invention are not necessarily limited to the above algorithms (i.e., the depthwise convolution and the pointwise convolution), and the order or number of times of applying each of the above algorithms may also be diversely changed.

Meanwhile, the transformation model derivation unit 220 according to one embodiment of the invention may function to derive, on the basis of the feature point detected from each of the first image of the person's posture and the second image of the person's posture, a transformation model that defines a transformation relationship between the attribute information of the first graphic object inputted onto the first image and attribute information of a second graphic object to be displayed on the second image in correspondence to the first graphic object.

Specifically, according to one embodiment of the invention, the second graphic object refers to a graphic object corresponding to the first graphic object, and may be a graphic object that is, when the first graphic object is inputted at a specific position on the first image, automatically displayed at a position on the second image corresponding to the specific position. Further, the second image of the person's posture corresponds to the first image, and may be an image in which a person is displayed who takes a posture similar to the posture of the person displayed in the first image.

FIGS. 3A to 4B illustratively show how to display a graphic object on an image according to one embodiment of the invention.

Figure 3A:
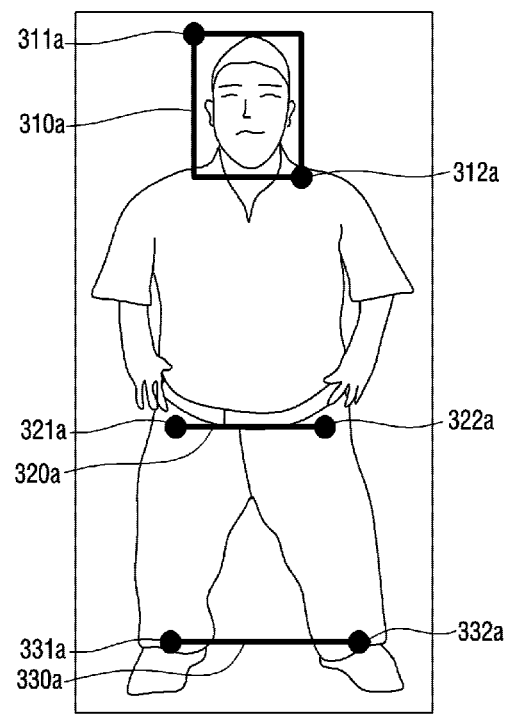
FIG. 3A illustratively shows how to display a graphic object on an image according to one embodiment of the invention.
Figure 3B:
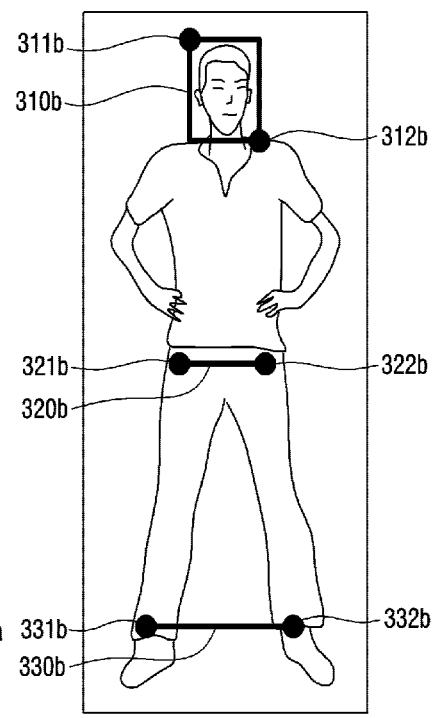
FIG. 3B illustratively shows how to display a graphic object on an image according to one embodiment of the invention.

For example, referring to FIGS. 3A and 3B, it may be assumed that a user inputs a first graphic object 310a at a specific position on a first image (FIG. 3A). In this case, the specific position may be specified on the basis of attribute information of the first graphic element 310a (e.g., absolute or relative coordinates of a point 311a, absolute or relative coordinates of a point 312a, and a rectangle). Further, a second graphic object 310b corresponding to the first graphic object 310*a* may be automatically displayed at a position on a second image (FIG. 3B) corresponding to the specific position. This function may be performed on the basis of a transformation model according to one embodiment of the invention, and deriving the transformation model will be described in detail later.

Meanwhile, when the user inputs a graphic object 320*a* or 330*a* at a specific position on the first image (FIG. 3A), a graphic object 320*b* or 330*b* may be displayed on the second image (FIG. 3B) in a manner similar to the above description, and thus a detailed description thereof will be omitted.

Figure 4A:
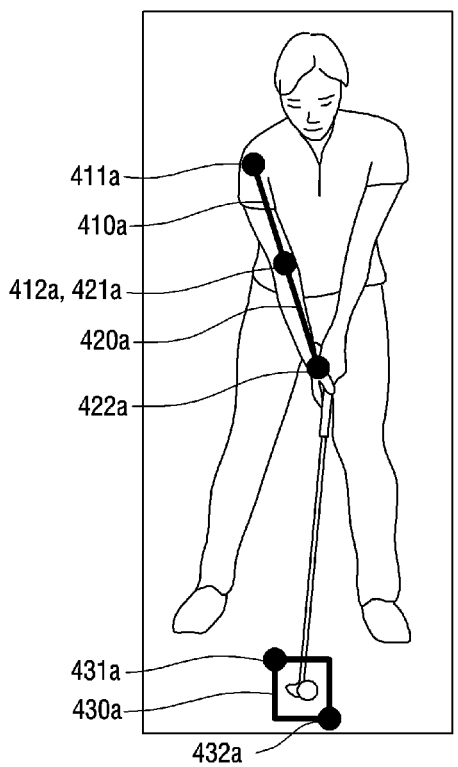
FIG. 4A illustratively shows how to display a graphic object on an image according to one embodiment of the invention.
Figure 4B:
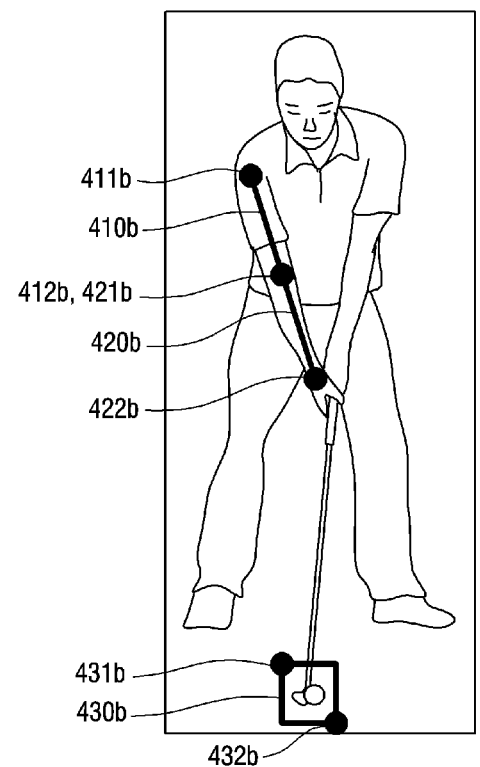
FIG. 4B illustratively shows how to display a graphic object on an image according to one embodiment of the invention.

As another example, referring to FIGS. 4A and 4B, it may be assumed that a user inputs a first graphic object 410*a* at a specific position on a first image (FIG. 4A). In this case, the specific position may be specified on the basis of attribute information of the first graphic element 410*a* (e.g., absolute or relative coordinates of a point 411*a*, absolute or relative coordinates of a point 412*a*, and a straight line). Further, a second graphic object 410*b* corresponding to the first graphic object 410*a* may be automatically displayed at a position on a second image (FIG. 4B) corresponding to the specific position.

Meanwhile, when the user inputs a graphic object 420*a* or 430*a* at a specific position on the first image (FIG. 4A), a graphic object 420*b* or 430*b* may be displayed on the second image (FIG. 4B) in a manner similar to the above description, and thus a detailed description thereof will be omitted.

Meanwhile, the transformation model derived by the transformation model derivation unit 220 according to one embodiment of the invention defines a transformation relationship between the attribute information of the first graphic object and the attribute information of the second graphic object, and the transformation relationship may be defined on the basis of the feature point detected from each of the first image and the second image.

Specifically, when the feature point detected from each of the first image and the second image by the transformation model derivation unit 220 according to one embodiment of the invention is at least one joint of a person, the transformation model derivation unit 220 according to one embodiment of the invention may make at least one joint detected from the first image correspond to at least one joint detected from the second image (e.g., make first to $n^{th}$ joints detected from the first image correspond to first to $n^{th}$ joints detected from the second image, respectively), and derive a transformation model by defining a relationship between the corresponding joints with reference to information on absolute or relative coordinates of the corresponding joints. That is, according to one embodiment of the invention, the transformation model may refer to a function that transforms a feature point detected from the first image into a feature point corresponding to the feature point detected from the first image, among feature points detected from the second image.

For example, the transformation model derivation unit 220 according to one embodiment of the invention may derive a least squares method-based affine transformation matrix as the transformation model, with reference to the information on absolute or relative coordinates of the corresponding joints.

However, the transformation model derived by the transformation model derivation unit 220 according to one embodiment of the invention is not limited to the least squares method-based affine transformation matrix as described above (e.g., a method other than the least squares method may be employed or a linear or non-linear function other than the matrix may be derived as the transformation model, or the transformation model may be derived on the basis of an image warping technique), and may be diversely changed as long as the objects of the invention may be achieved.

Meanwhile, the transformation model derivation unit 220 according to one embodiment of the invention may function to derive a transformation model for each group of feature points that are positionally associated among the feature points.

Specifically, the feature points detected by the transformation model derivation unit 220 according to one embodiment of the invention may be grouped into feature points that are positionally adjacent, and a transformation model may be derived for each of the grouped feature points.

For example, when the feature points detected by the transformation model derivation unit 220 according to one embodiment of the invention are joints and a golf club, the transformation model derivation unit 220 according to one embodiment of the invention may group the feature points by the joints detected from the head region, joints detected from the upper body region (including arms), joints detected from the lower body region, and golf club, and derive a transformation model for each of the grouped feature points. That is, according to one embodiment of the invention, it is possible to derive a single transformation model for all joints of a person, but it is also possible to derive transformation models for joints of the person's head region, joints of the person's upper body region, joints of the person's lower body region, and a golf club, respectively.

Meanwhile, when the user selects a frame of a specific posture of a person from a first image of the person's posture, the image management unit 210 according to one embodiment of the invention may function to modify a second image of a person's posture such that the frame of the specific posture is displayed in the second image before the user inputs a first graphic object onto the first image.

Specifically, according to one embodiment of the invention, the user may select a frame of a specific posture of a person from a first image of the person's posture, and the image management unit 210 according to one embodiment of the invention may identify to which posture the specific posture corresponds on the basis of a feature point detected from the first image by the transformation model derivation unit 220 according to one embodiment of the invention. Further, the image management unit 210 according to one embodiment of the invention may extract a frame corresponding to the identified posture from a second image of a person's posture on the basis of a feature point detected from the second image by the transformation model derivation unit 220 according to one embodiment of the invention, and modify the second image such that the frame is displayed in the second image.

For example, according to one embodiment of the invention, it may be assumed that the first image and the second image are videos of persons' golf swing postures. Further, in general, a golf swing may be composed of eight stages of partial motions such as an address, a takeaway, a back swing, a top-of-swing, a down swing, an impact, a follow-through, and a finish.

Continuing with the example, referring to FIGS. 4A and 4B, when the user selects a frame of a person's address posture (FIG. 4A) from the first image, the image management unit 210 according to one embodiment of the invention may extract a frame of a person's address posture (FIG. 4B) from the second image, and modify the second image such that the extracted frame of the address posture is automatically displayed in the second image.

Meanwhile, the golf swing according to one embodiment of the invention is not necessarily separated into the eight stages as described above. That is, it may be separated to further include detailed stages constituting each of the eight stages, or such that at least some of the eight stages constitute one stage.

Next, the graphic object management unit 230 according to one embodiment of the invention may function to display, on the basis of the transformation model derived by the transformation model derivation unit 220 according to one embodiment of the invention, the second graphic object at a position on the second image of the person's posture corresponding to a position of the first graphic object on the first image of the person's posture.

For example, referring to FIGS. 3A and 3B, by applying the transformation model derived by the transformation model derivation unit 220 according to one embodiment of the invention to (e.g., multiplying the affine transformation matrix by) position information of the first graphic object 310a inputted onto the first image (FIG. 3A) (e.g., absolute or relative coordinates of the point 311a and absolute or relative coordinates of the point 312a), position information of the second graphic object 310b corresponding to the first graphic object 310a (e.g., absolute or relative coordinates of a point 311b and absolute or relative coordinates of a point 312b) may be calculated. Further, the graphic object management unit 230 according to one embodiment of the invention may function to display the second graphic object 310b at a position on the second image (FIG. 3B) corresponding to a position of the first graphic object 310a on the first image (FIG. 3A), on the basis of the calculated position information of the second graphic object 310b and shape information of the second graphic object 310b (i.e., a rectangle)

Meanwhile, when the first graphic object 320a or 330a is inputted onto the first image (FIG. 3A), the graphic object management unit 230 according to one embodiment of the invention may also display the second graphic object 320b or 330b on the second image in the same manner as above, and thus a detailed description thereof will be omitted.

Meanwhile, when the transformation model derivation unit 220 according to one embodiment of the invention derives a transformation model for each group of feature points that are positionally associated among the feature points respectively derived from the first image and the second image, the graphic object management unit 230 according to one embodiment of the invention may function to display the second graphic object on the basis of the transformation model derived for a group of feature points positionally associated with the first graphic object.

According to one embodiment of the invention, by deriving transformation models for respective groups of positionally associated feature points, and displaying the second graphic object on the basis of the transformation model derived for a group of feature points positionally associated with the first graphic object among the derived transformation models, the second graphic object may be displayed at a more accurate position than when a single transformation model is derived for all the feature points.

For example, when the feature points derived by the transformation model derivation unit 220 according to one embodiment of the invention are a person's joints, a transformation model for joints of the person's head region, a transformation model for joints of the person's upper body region, and a transformation model for joints of the person's lower body region may be respectively derived. Further, referring to FIGS. 3A and 3B, the graphic object management unit 230 according to one embodiment of the invention may display the second graphic object 310b on the basis of a transformation model derived for a group of feature points positionally associated with the first graphic object 310a, i.e., the transformation model for the joints of the person's head region.

As another example, referring to FIGS. 3A and 3B, the graphic object management unit 230 according to one embodiment of the invention may display the second graphic object 320b or 330b on the basis of a transformation model derived for a group of feature points positionally associated with the first graphic object 320a or 330a, i.e., the transformation model for the joints of the person's lower body region.

As yet another example, referring to FIGS. 4A and 4B, the graphic object management unit 230 according to one embodiment of the invention may display the second graphic object 410b or 420b on the basis of a transformation model derived for a group of feature points positionally associated with the first graphic object 410a or 420a, i.e., the transformation model for the joints of the person's upper body region.

As still another example, referring to FIGS. 4A and 4B, the graphic object management unit 230 according to one embodiment of the invention may display the second graphic object 430b on the basis of a transformation model derived for a group of feature points positionally associated with the first graphic object 430a, i.e., a transformation model for the golf club.

Next, the communication unit 240 according to one embodiment of the invention may function to enable data transmission/reception from/to the image management unit 210, the transformation model derivation unit 220, and the graphic object management unit 230.

Lastly, the control unit 250 according to one embodiment of the invention may function to control data flow among the image management unit 210, the transformation model derivation unit 220, the graphic object management unit 230, and the communication unit 240. That is, the control unit 250 according to the invention may control data flow into/out of the graphic object display system 200 or data flow among the respective components of the graphic object display system 200, such that the image management unit 210, the transformation model derivation unit 220, the graphic object management unit 230, and the communication unit 240 may carry out their particular functions, respectively.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for displaying a graphic object on an image, the method comprising the steps of:
   acquiring, with respect to a first graphic object inputted by a user onto a first image of a person's posture, attribute information of the first graphic object that defines the first graphic object;
   deriving, on the basis of feature points detected from each of the first image and a second image of a person's posture, a transformation model that defines a transformation relationship between the attribute information of the first graphic object and attribute information of a second graphic object to be displayed on the second image in correspondence to the first graphic object; and
   displaying, on the basis of the transformation model, the second graphic object at a position on the second image corresponding to a position of the first graphic object on the first image,
   wherein the deriving step comprises the steps of:
   grouping the detected feature points into feature points that are positionally adjacent;
   deriving a transformation model for each group of the grouped feature points; and
   determining the transformation model derived for a group of feature points that are positionally associated with the first graphic object, among the groups of the feature points detected from the first image, as the transformation model that defines the transformation relationship between the attribute information of the first graphic object and the attribute information of the second graphic object.

2. The method of claim 1, wherein in the acquiring step, when the user selects a frame of a specific posture of the person from the first image, the second image is modified such that the frame of the specific posture is displayed in the second image before the first graphic object is inputted.

3. The method of claim 1, wherein the feature points correspond to at least one of at least one joint of the person and a golf club detected from each of the first image and the second image using an artificial neural network model.

4. A non-transitory computer-readable recording medium having stored thereon a computer program for executing the method of claim 1.

5. A system for displaying a graphic object on an image, the system comprising:
   an image management unit configured to acquire, with respect to a first graphic object inputted by a user onto a first image of a person's posture, attribute information of the first graphic object that defines the first graphic object;
   a transformation model derivation unit configured to derive, on the basis of feature points detected from each of the first image and a second image of a person's posture, a transformation model that defines a transformation relationship between the attribute information of the first graphic object and attribute information of a second graphic object to be displayed on the second image in correspondence to the first graphic object; and
   a graphic object management unit configured to display, on the basis of the transformation model, the second graphic object at a position on the second image corresponding to a position of the first graphic object on the first image,
   wherein the transformation model derivation unit is configured to:
   group the detected feature points into feature points that are positionally adjacent;
   derive a transformation model for each group of the grouped feature points; and
   determine the transformation model derived for a group of feature points that are positionally associated with the first graphic object, among the groups of the feature points detected from the first image, as the transformation model that defines the transformation relationship between the attribute information of the first graphic object and the attribute information of the second graphic object.

6. The system of claim 5, wherein the image management unit is configured to, when the user selects a frame of a specific posture of the person from the first image, modify the second image such that the frame of the specific posture is displayed in the second image before the first graphic object is inputted.

7. The system of claim 5, wherein the feature points correspond to at least one of at least one joint of the person and a golf club detected from each of the first image and the second image using an artificial neural network model.

* * * * *